United States Patent
Van Zalinge

[11] Patent Number: 5,966,110
[45] Date of Patent: Oct. 12, 1999

[54] LED DRIVER

[75] Inventor: Klaas Van Zalinge, Meylan, France

[73] Assignee: STMicroelectronics S.A., Gentilly, France

[21] Appl. No.: 08/758,207

[22] Filed: Nov. 26, 1996

[30] Foreign Application Priority Data

Nov. 27, 1995 [FR] France .................................. 95 15507

[51] Int. Cl.$^6$ .................................................. G09G 3/32
[52] U.S. Cl. .............................. 345/82; 345/46; 345/211; 345/212; 340/815.46
[58] Field of Search ................................. 345/46, 82, 33, 345/44, 34, 40, 39, 42, 211, 212, 83; 340/815.45, 815.44, 815.53

[56] References Cited

U.S. PATENT DOCUMENTS

| | | | |
|---|---|---|---|
| 3,925,690 | 12/1975 | Spence ...................................... | 326/83 |
| 4,190,836 | 2/1980 | Kimura et al. .............................. | 345/46 |
| 4,417,240 | 11/1983 | Ahmed ....................................... | 345/82 |
| 5,198,803 | 3/1993 | Shie et al. ................................. | 340/782 |
| 5,371,421 | 12/1994 | Kondoh et al. ............................. | 326/73 |
| 5,576,654 | 11/1996 | Shu et al. .................................. | 327/433 |
| 5,701,133 | 12/1997 | Miller et al. ............................... | 345/46 |

FOREIGN PATENT DOCUMENTS 2218183   8/1990   Japan .

OTHER PUBLICATIONS

Quinn, D.M., "Driver for Character Displays Using Light–Emitting Diodes," *IBM Technical Disclosure Bulletin*, vol. 16, No. 6, Nov. 1973, pp. 1983–1984.

Varenik, A.G. and A.A. Zhurin, "Stable Economical Current Modulator for Light–Emitting Diodes," *Instruments and Experimental Techniques*, vol. 31, No. 3, May 1988, pp. 699–700.

*Primary Examiner*—Dennis-Doon Chow
*Assistant Examiner*—Amr Awad
*Attorney, Agent, or Firm*—David V. Carlson; Dennis M. de Guzman; Seed and Berry LLP

[57] ABSTRACT

An LED driver drives a plurality of light emitting diodes (LEDs) having first terminals connected to a common output stage and second terminals respectively receiving different, suitably rectified, phases of a sinusoidal signal. An output stage of the LED driver includes a first bipolar transistor coupled between a first supply terminal and the first terminals of the LED's. A first MOS transistor drives the base of the first bipolar transistor. The gate of the first MOS transistor is coupled to a first reference voltage. A second bipolar cascode transistor is connected in series with the first MOS transistor and biased by a second reference voltage such that the voltage across the first MOS transistor does not exceed a limit value.

19 Claims, 2 Drawing Sheets

(PRIOR ART) Fig 1A

LED DRIVER

BACKGROUND OF THE INVENTION

1. Field of the Invention

The present invention relates to devices for independently driving several LEDs (Light-Emitting Diodes), such as segments of a digital LED display.

2. Discussion of the Related Art

FIG. 1A shows a conventional driver for the segments of a LED display. Such a driver is commonly used in digital clock displays. The LED segments are grouped by pairs and the control of both LEDs of each pair is multiplexed. FIG. 1A shows the driver coupled to one pair of LEDs LD1, LD2. Both LEDs LD1, LD2 are controlled by an output stage 10 comprising a P-MOS transistor MP1 whose source is connected to a high supply terminal Vcc and whose drain is connected to the anodes of both LEDs LD1, LD2. The gate of transistor MP1 is connected to a reference voltage node P through a switch S1 and to terminal Vcc through a switch S2. Switches S1 and S2 are controlled in phase opposition. When one of the LEDs LD1, LD2 is to be turned on, switch S1 is closed and switch S2 is opened, which turns on transistor MP1. Transistor MP1 is turned off when switch S1 is opened and switch S2 is closed. Switch S2 is necessary to discharge the gate capacitance of transistor MP1.

The cathodes of LEDs LD1 and LD2 respectively receive two different phases $\phi 1$ and $\phi 2$ of a rectified sinusoidal voltage taken from the mains.

FIG. 1B shows the two phases ($\phi 1$ and $\phi 2$ of the sinusoidal voltage. The sinusoidal voltage is referenced to the supply voltage Vcc. Phase $\phi 1$ corresponds to the negative half periods of the sinusoidal voltage and phase $\phi 2$ corresponds to the negatively rectified positive half periods of the sinusoidal voltage. LED LD1 can only turn on when phase $\phi 1$ exceeds its threshold voltage Vt1. Similarly, LED LD2 can only turn on when phase $\phi 2$ exceeds its threshold voltage Vt2. Thus, there are time intervals at the beginning and at the end of each phase where both LEDs LD1 and LD2 are always off, even though transistor MP1 is on.

The output stages 10 coupled to all the controlled pairs of LEDs are connected to a common reference source 11 with which the output stages 10 form a multiple output current mirror. Reference stage 11 comprises a P-MOS transistor MP2 having its source connected to the supply voltage Vcc and its drain connected to ground GND through a current generator 13. The gate and drain of transistor MP2 are connected together and constitute the node P where the reference voltage for the output stages 10 is taken. The current supplied to each LED LD1, LD2 is equal to the current provided by the current generator 13, multiplied by the size ratio between transistors MP1 and MP2. This size ratio is relatively large, because a LED requires a relatively large current, usually in the range of 6 mA–30 mA.

LED drivers of the type of FIG. 1A, especially in digital display clocks, are often realized in P-MOS technology. P-MOS technology is becoming obsolete and will no longer exist in the coming years. However, some P-MOS technology circuits are still being widely used. Therefore, there is a tendency to adapt the old P-MOS circuits to new technologies. This is not always easy, especially if the new circuits must have the same specifications as the old circuits, in particular the maximum supply voltage of about 15 V.

The LED driver of FIG. 1A cannot be directly realized in CMOS technology, since current CMOS transistors will accept maximum supply voltages of only 5 V or less.

FIG. 2 shows a possible implementation of the circuit of FIG. 1A in bipolar technology. Bipolar transistors accept higher voltages than CMOS transistors. The P-MOS transistors MP1 and MP2 are replaced by PNP transistors QP1 and QP2. To avoid an undesirable influence which would be caused by the base current taken by transistor QP1, transistor QP2 has only its base connected to node P and an additional PNP transistor Q3 has its emitter connected to node P, its collector connected to ground GND and its base connected between transistor QP2 and current generator 13. This reduces the influence of the base current of transistor QP1 by a factor $\beta$ (the gain of transistor Q3).

A drawback of this circuit is encountered during the time intervals where the phases $\phi 1$ and $\phi 2$ have not yet reached the thresholds Vt1 and Vt2 of the LEDs LD1, LD2. In this case, when transistor QP1 is on, the high current that would normally flow through LED LD1 or LD2, flows into transistor Q3 through the emitter-base junction of transistor QP1. The base current of transistor QP1 is then a factor $\beta$ (gain of transistor QP1) higher than in normal operation, which causes a considerable increase in power consumption.

SUMMARY OF THE INVENTION

The present invention provides a high-voltage and low power consumption LED driver realized in a recent technology.

In a presently preferred embodiment, a device for driving a plurality of light emitting diodes (LEDs) has first terminals connected to a common output stage and second terminals respectively receiving different, suitably rectified, phases of a sinusoidal signal. The output stage comprises a first bipolar transistor coupled between a first supply terminal and the first terminals of the LEDs; a first MOS transistor for driving the base of the first bipolar transistor, the gate of the first MOS transistor being coupled to a first reference voltage; and a second bipolar cascode transistor connected in series with the first MOS transistor and biased by a second reference voltage such that the voltage across the first MOS transistor does not exceed a limit value.

According to an embodiment of the invention, the base of the bipolar cascode transistor is connected to the second reference voltage through a resistor.

According to an embodiment of the invention, the first reference voltage is provided by a reference stage comprising a third bipolar transistor coupled between the first supply terminal and a current generator; a second MOS transistor for driving the base of the third bipolar transistor; and a fourth bipolar transistor connected between a second supply terminal and the gate of the second MOS transistor where the first reference voltage is taken, the base of the fourth bipolar transistor being connected between the current generator and the third bipolar transistor.

According to an embodiment of the invention, the second reference voltage is taken at the base of the fourth bipolar transistor.

According to an embodiment of the invention, the first MOS transistor is connected between the first supply terminal and the base of the first bipolar transistor.

According to an embodiment of the invention, the second MOS transistor is connected between the first supply terminal and the base of the third bipolar transistor.

The foregoing and other objects, features and advantages of the present invention will appear by reading the following description of preferred embodiments, in conjunction with the attached figures.

BRIEF DESCRIPTION OF THE DRAWINGS

FIG. 1A illustrates a prior art LED driver.

DETAILED DESCRIPTION

Figure 2:
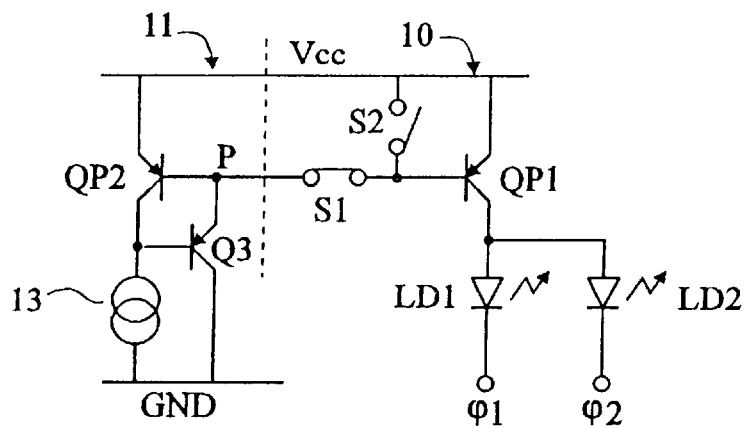
FIG. 2 shows a possible but not preferred implementation of an LED driver in bipolar technology.
Figure 3:
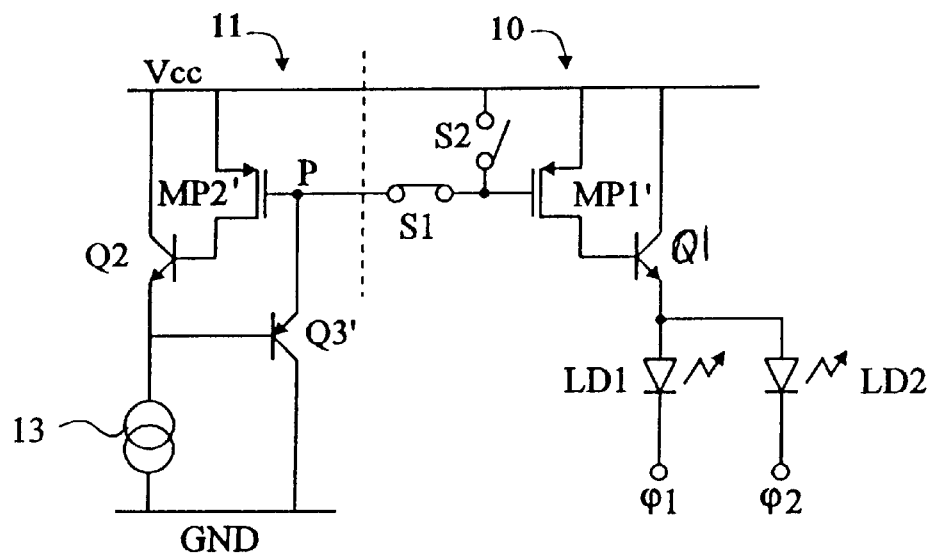
FIG. 3 illustrates a first step according to the invention in realizing a low-power high-voltage LED driver in a recent technology.

In FIG. 3, an attempt has been made according to the invention for realizing the LED driver of FIG. 1A in BI-CMOS technology. In the output stage 10, transistor MP1 of FIG. 1A has been replaced by a composite Darlington transistor comprised of a bipolar NPN transistor Q1 driven by a P-MOS transistor MP1'. The emitter of transistor Q1 is connected to the anodes of LEDs LD1 and LD2, and its collector is connected to the power supply Vcc. Transistor MP1' is connected like transistor MP1 of FIG. 1A, except that its drain is connected to the base of transistor Q1. In order to achieve a suitable mirroring function, in the reference stage 11, transistor MP2 of FIG. 1A has also been replaced by a composite Darlington transistor comprised of a bipolar NPN transistor Q2 and a P-MOS transistor MP2' connected in a similar manner as transistors Q1 and MP1'. The emitter of transistor Q2 is connected to current generator 13 and the gate of transistor MP2' constitutes the reference voltage node P. To complete the mirroring function, a bipolar PNP transistor Q3' is connected in a similar way as transistor Q3 of FIG. 2 for establishing the reference voltage at node P with a low impedance.

With this configuration, the drive current of LEDs LD1, LD2 is equal to the current of generator 13, multiplied by the ratio between the sizes of transistors Q1 and Q2. Transistors MP1' and MP2' are of same size.

In BI-CMOS technology, the bipolar transistors can withstand high voltages but the MOS transistors cannot.

MOS transistor MP2' always operates within its limits because its source-drain voltage is substantially equal to its source-gate voltage (slightly above the threshold voltage of transistor MP2'). Indeed, the voltage at node P (the gate of transistor MP2') is reduced by one base-emitter voltage (Vbe) of transistor Q3' at the base of transistor Q3' and increased again by one Vbe voltage of transistor Q2 at the drain of transistor MP2'.

However, when either phase φ1 or phase φ2 is low, the drain of transistor MP1' is brought to a low voltage through LED LD1 or LD2 and the base-emitter junction of transistor Q1, while the source of transistor MP1' stays connected to the high supply voltage Vcc. The source-drain voltage of transistor MP1' can then become undesirably high.

Figure 4:
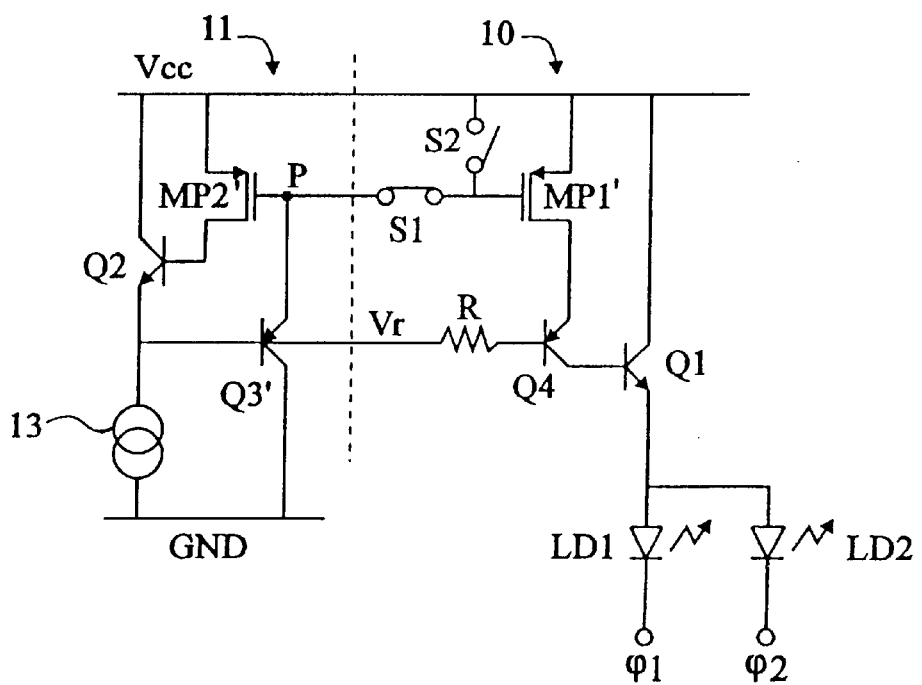
FIG. 4 shows an embodiment of an LED driver according to the invention.

FIG. 4 shows an embodiment of a LED driver according to the invention, derived from the circuit of FIG. 3 but capable of operating with a high supply voltage. The difference for FIG. 3 is that the drain of transistor MP1' is connected to the base of transistor Q1 through a bipolar PNP cascode transistor Q4. The emitter of transistor Q4 is connected to the drain of transistor MP1' and its collector is connected to the base of transistor Q1. The base of transistor Q4 receives a reference voltage Vr through a resistor R. Therefore, the drain voltage of transistor MP1' is fixed at a value substantially equal to the reference voltage Vr plus one Vbe voltage of transistor Q4. Voltage Vr is chosen sufficiently near voltage Vcc to bring the source-drain voltage of transistor MP1' at an acceptable value. As shown in FIG. 4, for example, this reference voltage Vr can be taken at the emitter of transistor Q2 which is at a value equal to the voltage of node P minus one Vbe voltage of transistor Q3'.

Figure 1B:
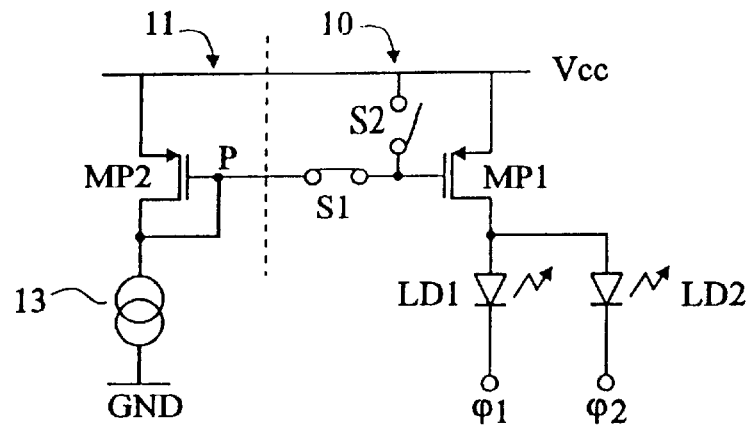
FIG. 1B presents signal waveforms input to the LED driver of FIG. 1A.
Figure 1B:
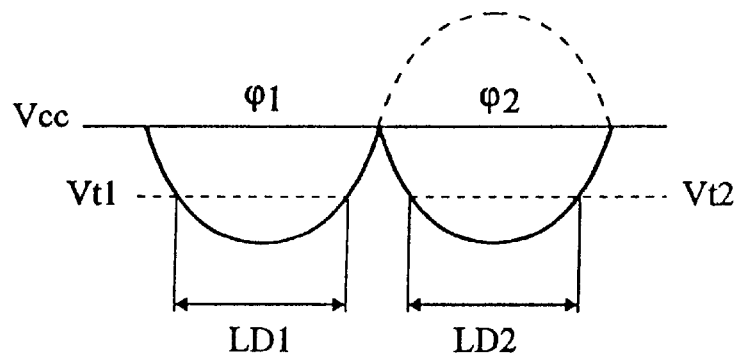

With the elements that have just been described, when transistor MP1' is on, transistor Q1 derives no base current until a phase φ1 or φ2 exceeds the threshold voltage of LED LD1 or LD2 (see FIG. 1B). Until then, the base-emitter junction of transistor Q4 is forward biased and a current will flow therethrough from transistor MP1' to current generator 13. This reduces the current in transistor Q2 and thus the current in transistor MP1'. A steady state is reached where some current, strongly depending on the technology, still flows through the base-emitter junction of transistor Q4.

To reduce this current flowing uselessly through the base-emitter junction of transistor Q4, the resistor R is placed between the base of transistor Q4 and reference voltage Vr. With this arrangement, when an excess current flows from transistor Q4 into current generator 13, the base voltage of transistor Q4 increases. If the value of resistor R is chosen sufficiently high, transistor MP1' will operate in its linear range (as a resistor), thereby further decreasing its current.

As soon as the threshold of LED LD1 or LD2 is exceeded by the corresponding phase φ1 or φ2, the current which flowed in excess through resistor R can flow again through the base of transistor Q1. The drain voltage of transistor MP1' drops to its normal value substantially equal to reference voltage Vr plus one Vbe voltage of transistor Q4.

With the particular polarities chosen in FIG. 4 for the transistors, an advantage is that the transistor, Q1, which provides the most current, is an NPN transistor which can be integrated in a particularly small surface area. The circuit will also work if the polarities of the transistors and of the supply terminals are exchanged.

I claim:

1. A device for driving a plurality of light emitting diodes (LEDs) having first terminals connected to a common output stage and second terminals respectively receiving different, suitably rectified, phases of a sinusoidal signal, wherein the output stage comprises:

a first bipolar transistor coupled between a first supply terminal and the first terminals of the LEDs;

a first MOS transistor for driving the base of the first bipolar transistor, the gate of the first MOS transistor being coupled to a first reference voltage, the source of the first MOS transistor coupled to the first supply terminal, and the drain of the first MOS transistor being coupled to the first bipolar transistor; and a second bipolar cascode transistor connected in series with the first MOS transistor, such that the emitter of the second bipolar cascode transistor is coupled to the first MOS transistor and the collector of the second the bipolar cascode transistor is coupled to the base of the first bipolar transistor, the second bipolar cascode transistor being biased by a second reference voltage such that the voltage across the first MOS transistor does not exceed a limit value.

2. The device according to claim 1 wherein the base of the second bipolar cascode transistor is connected to the second reference voltage through a resistor.

3. The device according to claim 1 wherein the first reference voltage is provided by a reference stage comprising:

a third bipolar transistor coupled between the first supply terminal and a current generator;

a second MOS transistor for driving the base of the third bipolar transistor; and a fourth bipolar transistor connected between a second supply terminal and the gate of the second MOS transistor where the first reference voltage is taken, the base of the fourth bipolar transistor being connected between the current generator and the third bipolar transistor.

4. The device according to claim 3 wherein the second reference voltage is taken at the base of the fourth bipolar transistor.

5. The device according to claim 3 wherein the second MOS transistor is connected between the first supply terminal and the base of the third bipolar transistor.

6. The device according to claim 1 wherein the first MOS transistor is connected between the first supply terminal and the base of the first bipolar transistor.

7. An LED driver circuit for supplying a driving current to an LED coupled to a driver source, the LED driver circuit comprising:

a supply voltage;

a BI-CMOS reference stage coupled between the supply voltage and the driver source, the reference stage having a reference output for providing a reference current; and a BI-CMOS output stage coupled between the supply voltage and the LED, the output stage having a current output coupled to the LED and having a reference input coupled to the reference stage such that a current from the current output mirrors the reference current wherein the output stage includes a MOS transistor coupled between the supply voltage and a second bipolar transistor, the MOS transistor having a drain coupled to the second bipolar transistor a source coupled to the supply voltage, and a gate coupled to the reference stage.

8. The driver circuit of claim 7 wherein the reference stage includes:

a first bipolar transistor coupled to the supply voltage; and a current source coupled between the first bipolar transistor and a reference potential.

9. The driver circuit of claim 8 wherein the second bipolar transistor has a base coupled at a node between the current source and the first bipolar transistor.

10. The driver circuit of claim 9, further including a limiting resistor coupled between the base of the second bipolar transistor and the node.

11. The driver circuit of claim 7, further including a third bipolar transistor cascode-connected with the MOS transistor.

12. The driver circuit of claim 7, further including a first switch coupled at a second node between the reference output and the reference input.

13. The driver circuit of claim 7, further including a second switch coupled between the supply voltage and the second node.

14. A display device, comprising:

a plurality of light emitters;

a supply voltage;

a first reference circuit stage coupled to the supply voltage, the first reference circuit stage having a reference output for providing a reference current and having a first bipolar transistor and a first MOS transistor; and an output circuit stage coupled between the supply voltage and the light emitters, the output circuit stage having a current output coupled to the light emitters and a control input coupled to receive the reference current from the reference output of the first reference circuit, the output stage being configured to provide an output current to the light emitters that mirrors the reference current, the output circuit stage including a second bipolar transistor and a second MOS transistor, wherein a drain of the second MOS transistor is coupled to the second bipolar transistor, a source of the second MOS transistor is coupled to the supply voltage, and a gate of the second MOS transistor is coupled to the first reference circuit stage.

15. The display device of claim 14 wherein the first reference circuit stage includes a current source coupled between the first bipolar transistor and a reference potential and wherein the first bipolar transistor is coupled to the supply voltage.

16. The display device of claim 14 wherein the second bipolar transistor includes a base coupled at a node between a current source and the first bipolar transistor.

17. A method of controlling current through a light emitter having a plurality of LEDs, comprising:

drawing a reference current through a BI-MOS reference stage having a first MOS transistor;

limiting a voltage across the first MOS transistor with a first bipolar device;

producing an output current by mirroring the reference current with a BI-MOS output stage having a second MOS transistor;

limiting a voltage across the second MOS transistor with a second bipolar device;

providing the output current to the light emitter; and driving respective ones of the LEDs with phase opposed driving signals.

18. The method of claim 17, further including limiting current flow through the output stage during inactive periods.

19. The method of claim 18 wherein limiting current flow through the output stage comprises:

producing a biasing voltage in response to the current flow through the output stage; and limiting current flow in response to the biasing voltage.

* * * * *